United States Patent
Ohara et al.

(10) Patent No.: US 8,053,383 B2
(45) Date of Patent: Nov. 8, 2011

(54) LIGHT-AMPLIFYING GLASS

(75) Inventors: Seiki Ohara, Tokyo (JP); Yuki Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/071,579

(22) Filed: Mar. 25, 2011

(65) Prior Publication Data

US 2011/0172076 A1 Jul. 14, 2011

Related U.S. Application Data

(63) Continuation of application No. PCT/JP2009/068694, filed on Oct. 30, 2009.

(30) Foreign Application Priority Data

Nov. 6, 2008 (JP) ................................. 2008-285527

(51) Int. Cl.
  C03C 13/04 (2006.01)
  C03C 3/15 (2006.01)
  C03C 3/068 (2006.01)
  H04B 10/12 (2006.01)
(52) U.S. Cl. ............... 501/37; 501/41; 501/50; 501/73; 501/78; 385/142; 372/40; 359/341.5
(58) Field of Classification Search .................. 501/37, 501/41, 50, 73, 78; 385/142; 372/40; 359/341.5
See application file for complete search history.

(56) References Cited

U.S. PATENT DOCUMENTS 6,819,860 B2 * 11/2004 Ohara et al. ................. 385/142
7,515,332 B2 * 4/2009 Tsuda ........................ 359/341.5

FOREIGN PATENT DOCUMENTS

| JP | 2002-145636 | 5/2002 |
| JP | 2003-183049 | 7/2003 |
| JP | 2007-149766 | 6/2007 |

OTHER PUBLICATIONS

International Search Report issued Jan. 12, 2010 in PCT/JP/09/068694 filed Dec. 4, 2009.
Paschotta et al., "Ytterbium-Doped Fiber Amplifiers", J. Quantum Electron., vol. 33, No. 7, pp. 1049-1056 (1997).

* cited by examiner

Primary Examiner — Karl Group
(74) Attorney, Agent, or Firm — Oblon, Spivak, McClelland, Maier & Neustadt, L.L.P.

(57) ABSTRACT

To provide a light-amplifying glass capable of increasing absorption of $Yb^{3+}$. A light-amplifying glass to be used for amplifying light having a wavelength of 1.0 to 1.2 μm, which comprises, as represented by mol % based on the following oxides, from 30 to 55% of $Bi_2O_3$, from 25 to 50% of either one, or both in total, of $SiO_2$ and $B_2O_3$, from 12 to 27% of either one, or both in total, of $Al_2O_3$ and $Ga_2O_3$, from 0 to 4% of $La_2O_3$ and from 0.1 to 4% of $Yb_2O_3$ and which contains substantially no $Er_2O_3$. An optical waveguide having such a light-amplifying glass as a core.

19 Claims, 1 Drawing Sheet

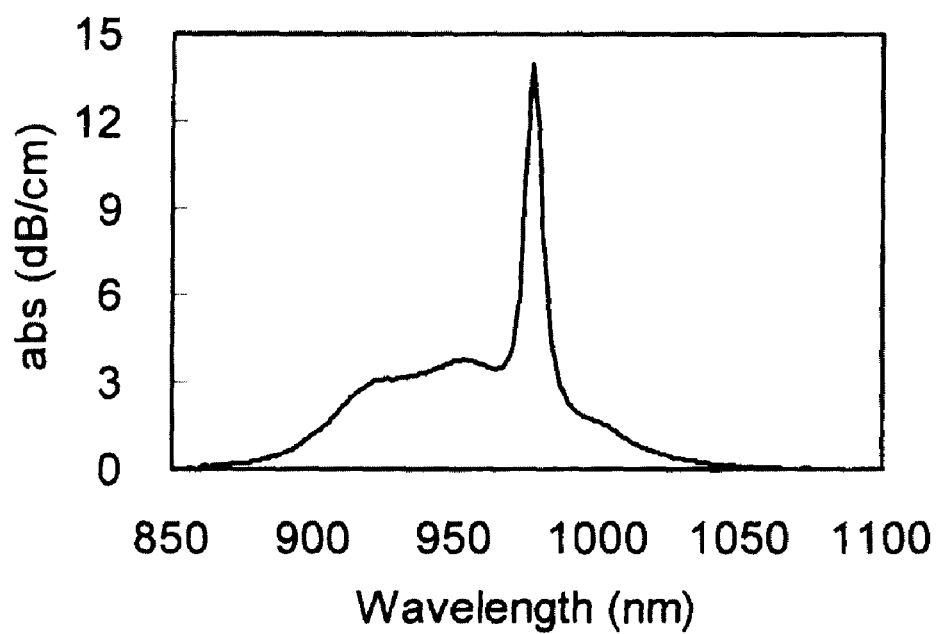
Figure

LIGHT-AMPLIFYING GLASS

TECHNICAL FIELD

The present invention relates to a light-amplifying glass suitable for amplifying light having a wavelength of from 1.0 to 1.2 μm.

BACKGROUND ART

In recent years, as a processing laser, a fiber laser made of a fiber having Yb incorporated has been developed as a substitute for a solid YAG laser. The fiber laser is characterized in that the beam quality is good since the light propagation mode is limited, and heat dissipation is excellent by a fine fiber, whereby no cooling is required.

As the fiber having Yb incorporated, one containing quartz glass as the base is usually employed. The absorption of $Yb^{3+}$ observed in the vicinity of 975 nm of a Yb-incorporated single mode fiber using quartz as the base, is usually from about 0.8 to 3.5 dB/cm. Further, the absorption of $Yb^{3+}$ in glass has a sharp peak in the vicinity of 975 nm and has another absorption peak in the vicinity of 915 nm on the shorter wavelength side thereof (Non-Patent Document 1). As the excitation wavelength for a Yb-incorporated fiber, 975 nm or 915 nm, or less than 975 nm and more than 915 nm, is usually employed.

PRIOR ART DOCUMENT

Non-Patent Document

Non-Patent Document 1: IEEE J. Quantum Electron., vol. 33, pp. 1049-1056, 1997

DISCLOSURE OF THE INVENTION

Problems to be Solved by the Invention

Absorption of the Yb-incorporated single mode fiber using quartz as the base is at a level of 3.5 dB/cm even at the maximum, whereby it was not possible to sufficiently shorten the fiber length required for emission of light. Accordingly, it was not possible to sufficiently increase the oscillation frequency when it is desired to carry out pulse laser oscillation, and it was not possible to sufficiently suppress the influence of induced Brillouin scattering which increases in proportion to the fiber length, whereby it was difficult to attain stable amplification.

Further, with the Yb-incorporated single mode fiber using quartz as the base, there was a valley in absorption between the peaks in the vicinity of 915 nm and 975 nm, and the absorbance at the valley was as low as at most one half of the value at 915 nm. Therefore, in a case where a semiconductor laser was employed as the excitation light, there was a problem that due to the shift in wavelength, the absorption efficiency of the excitation light was likely to change, whereby a change in the output was likely to occur.

It is an object of the present invention to provide a light-amplifying glass, an optical waveguide and an optical fiber, which can solve such problems.

Means to Solve the Problems

The present invention provides a light-amplifying glass to be used for amplifying light having a wavelength of 1.0 to 1.2 μm, which comprises, as represented by mol % based on the following oxides, from 30 to 55% of $Bi_2O_3$, from 25 to 50% of either one, or both in total, of $SiO_2$ and $B_2O_3$, from 12 to 27% of either one, or both in total, of $Al_2O_3$ and $Ga_2O_3$, from 0 to 4% of $La_2O_3$ and from 0.1 to 4% of $Yb_2O_3$ and which contains substantially no $Er_2O_3$ (hereinafter sometimes referred to as the first light-amplifying glass). Here, for example "comprises . . . from 0 to 4% of $La_2O_3$" means that $La_2O_3$ is not essential but may be contained up to 4%.

Further, the present invention provides a light-amplifying glass which comprises, as represented by mol % based on the following oxides, from 30 to 55% of $Bi_2O_3$, from 25 to 50% of either one, or both in total, of $SiO_2$ and $B_2O_3$, from 12 to 27% of either one, or both in total, of $Al_2O_3$ and $Ga_2O_3$, from 0 to 4% of $La_2O_3$ and from 0.1 to 4% of $Yb_2O_3$ and which contains substantially no $Er_2O_3$ or $Tm_2O_3$ (hereinafter sometimes referred to as the second light-amplifying glass). This light-amplifying glass is used typically for amplifying light having a wavelength of from 1.0 to 1.2 μm.

Further, the present invention provides an optical waveguide having the above light-amplifying glass as a core.

Further, the present invention provides an optical fiber having the above light-amplifying glass as a core.

Advantageous Effects of Invention

According to the present invention, the absorbance by Yb will be large, and a strong emission of light is obtainable, whereby it becomes possible to shorten the fiber length required, and for example, when it is desired to carry out pulse laser oscillation, it becomes possible to increase the oscillation frequency by shortening the oscillator length. Further, stable amplification will be possible by suppressing the influence of induced Brillouin scattering which increases in proportion to the fiber length.

Further, if the absorption peak is sharp, the proportion of the excitation light to be absorbed, is likely to change depending upon the excitation wavelength, whereby it is required to strictly select the excitation light wavelength. Whereas, according to a preferred embodiment of the present invention, the absorption band may have a broad range, whereby the excitation wavelength may also have a broad range, and, for example, it becomes possible to broaden the acceptable range of the excitation wavelength for a semiconductor laser.

BRIEF DESCRIPTION OF THE DRAWING

FIG. 1 is a view showing the absorption spectrum of a light-amplifying glass of the present invention.

BEST MODE FOR CARRYING OUT THE INVENTION

The light-amplifying glass of the present invention (hereinafter referred to as the glass of the present invention) as a core of an optical waveguide having a core/clad structure, such as a glass fiber having the same structure or a flat waveguide having the same structure. Here, such an optical waveguide having a core/clad structure is the optical waveguide of the present invention, and the glass fiber having the same structure is the optical fiber of the present invention.

In the optical fiber of the present invention, the core diameter and the clad diameter are typically from 2 to 10 μm and from 100 to 400 μm, respectively. Further, in a case where the optical fiber of the present invention is used as a high output optical fiber, the core diameter is preferably from 10 to 25 μm.

The optical waveguide and the optical fiber of the present invention are suitable for amplifying light having a wavelength of from 1.0 to 1.2 μm.

Such amplification is carried out by introducing the excitation light into the core together with the light (signal light) to be amplified, and as the excitation light, light having a wavelength of from 900 to 1,000 nm is usually employed.

The absorption coefficient (absorbance) of the glass of the present invention is preferably at least 4 dB/cm at a wavelength within a wavelength region of from 940 to 990 nm. That is, the maximum value $A(p)$ of the absorption coefficient in that wavelength region is preferably at least 4 dB/cm.

The absorption coefficient $A(940)$ at a wavelength of 940 nm of the glass of the present invention is preferably at least 1 dB/cm. If it is less than 1 dB/cm, $A(p)$ tends to be less than 4 dB/cm.

The glass transition point Tg of the glass of the present invention is preferably at least 400° C. If Tg is lower than 400° C., it is likely that when a laser beam having a high intensity is used as the excitation light, the temperature of the glass is likely to be locally high, and the glass is likely to be thermally damaged, and as a result, the light loss is likely to increase and, light-amplification tends to be inadequate. It is more preferably at least 430° C., particularly preferably at least 450° C.

Now, components of the glass of the present invention will be described by using contents represented by mol percentage.

In the glass of the present invention, $Yb_2O_3$ is essential, since light-amplification is carried out by utilizing induced emission from the $^2F_{5/2}$ level to the $^2F_{7/2}$ level of $Yb^{3+}$. If $Yb_2O_3$ is less than 0.1%, no adequate amplification can be obtained. It is preferably at least 0.15%, more preferably at least 0.3%, particularly preferably at least 0.5%. Further, if it exceeds 4%, vitrification tends to be difficult. It is preferably at most 3%, more preferably at most 2%.

$Bi_2O_3$ is an essential component. If its content is less than 30%, the absorption coefficient of Yb is likely to be small. It is preferably at least 35%, more preferably at least 40%. If it exceeds 55%, vitrification tends to be difficult, devitrification is likely to occur during fiber processing, or Tg tends to be too low. It is preferably at most 50%, more preferably at most 45%. Here, devitrification is such that crystal precipitation is remarkable, whereby the fiber is likely to break during the fiber processing, or fiber breakage is likely to occur during its use as an optical fiber.

$SiO_2$ and $B_2O_3$ are network formers, and at least one of them must be contained in order to facilitate formation of the glass by suppressing crystal precipitation during the preparation of the glass. If the total of their contents i.e. $SiO_2+B_2O_3$ is less than 25%, vitrification tends to be difficult, or devitrification is likely to occur during the fiber processing. It is preferably at least 28%, more preferably at least 30%. If it exceeds 50%, the emission intensity tends to deteriorate. It is preferably at most 45%, more preferably at most 40%, particularly preferably at most 35%.

In a case where $SiO_2$ is contained, its content is preferably at least 10%, more preferably at least 20%, particularly preferably at least 30%. Further, its content is preferably at most 45%, more preferably at most 40%.

In a case where $B_2O_3$ is contained, its content is preferably at most 35%, more preferably at most 30%, particularly preferably at most 20%. In a case where it is desired to improve the heat resistance, the content of $B_2O_3$ is preferably made to be at most 10%, and more preferably no $B_2O_3$ is contained.

In a case where it is desired to improve the melting property, it is preferred that $SiO_2$ is at least 25%, and $B_2O_3$ is from 0 to 10%.

$Al_2O_3$ and $Ga_2O_3$ are effective to suppress devitrification, and either one of them must be contained. If the total of their contents i.e. $Al_2O_3+Ga_2O_3$ is less than 12%, the effect to prevent devitrification tends to be small. The total content is preferably at least 15%, more preferably at least 18%, particularly preferably at least 20%. If it exceeds 27%, devitrification is rather likely to occur. It is preferably at most 25%, more preferably at most 23%.

Further, in a case where it is desired to increase the emission intensity, it is preferred to incorporate $Ga_2O_3$.

In a case where $Al_2O_3$ is contained, its content is preferably at least 1%, more preferably at least 3%. Further, its content is preferably at most 12%, more preferably at most 10%.

In a case where $Ga_2O_3$ is contained, its content is preferably at least 1%, more preferably at least 5%, particularly preferably at least 10%. Further, its content is preferably at most 25%, more preferably at most 20%.

It is preferred that $Bi_2O_3$ is from 35 to 50%, $SiO_2$ is from 0 to 45%, $B_2O_3$ is from 0 to 35%, $Al_2O_3$ is from 0 to 12%, and $Ga_2O_3$ is from 5 to 25%.

$La_2O_3$ is not essential, but may be contained up to 4%, since it has an effect to control concentration quenching or an effect to increase the emission intensity. If it exceeds 4%, devitrification is likely to occur. It is more preferably at most 3%. In a case where $La_2O_3$ is contained, its content is preferably at least 0.5%, more preferably at least 1%, particularly preferably at least 2%.

The glass of the present invention consists essentially of the above components, but within a range not to impair the purpose of the present invention, it may contain other components typically in a total amount within a range of at most 10%, preferably at most 5%.

For example, $CeO_2$ may be contained up to 1% in order to prevent deterioration of the transparency of the glass by precipitation of $Bi_2O_3$ in the form of metal bismuth in molten glass. If it exceeds 1%, yellowing or orange-coloring of the glass tends to be remarkable, and the transmittance tends to deteriorate. It is preferably at most 0.5%. In a case where $CeO_2$ is contained, its content is preferably at least 0.1%. In a case where it is desired to increase the transmittance, it is preferred that no $CeO_2$ is contained.

Further, in order to prevent devitrification during the fiber processing or to facilitate vitrification, $Li_2O$, $Na_2O$, $K_2O$, MgO, CaO, SrO, BaO, $ZrO_2$, ZnO, CdO, $GeO_2$, $TiO_2$, $In_2O_3$, PbO, $TeO_2$, etc. may be incorporated.

Further, the glass contains substantially no $Er_2O_3$, and the content of $Er_2O_3$ is typically at most 0.02%, preferably less than 0.01%. If $Er_2O_3$ is substantially contained, the energy transition of the excited state of $Yb^{3+}$ to $Er^{3+}$ is likely to occur, whereby amplification of light having a wavelength of from 1.0 to 1.2 µm tends to be hardly carried out, and the object of the present invention is likely to be impaired.

Further, in the case of $Tm_2O_3$, the $Tm^{3+}$ energy level ($^3H_5$) is present between the ground level ($^2F_{5/2}$) and the upper level ($^2F_{7/2}$) of $Yb^{3+}$, whereby the energy is likely to be deprived by $Tm^{3+}$, whereby the efficiency tends to deteriorate. Accordingly, in the first light-amplifying glass, no $Tm_2O_3$ is preferably contained, and the second light-amplifying glass, substantially no $Tm_2O_3$ is preferably contained, and the content of $Tm_2O_3$ is typically at most 0.02%, preferably less than 0.01%.

The method for producing the glass of the present invention is not particularly limited, and for example, it can be produced by a melting method which comprises preparing and mixing raw materials, putting them in a gold crucible, an alumina crucible, a quartz crucible or an iridium crucible, melting them at temperature of from 800 to 1,300° C. in air, and casting the obtained melt in a prescribed mold. Otherwise, it may be produced by a method other than the melting method, such as a sol-gel method or a gas phase vapor deposition method.

EXAMPLES

Glasses having compositions as represented by mol % in the rows for $Bi_2O_3$ to $CeO_2$ in Tables 1 to 3, were prepared by a melting method for melting at 1,150° C. Further, the glass transition temperature Tg (unit: ° C.), the relative emission intensity E at a wavelength of 1,064 nm, the emission lifetime τ (unit: ms) at a wavelength of 1,064 nm, the absorption coefficient A (915) (unit: dB/cm) at a wavelength of 915 nm, the absorption coefficient A (940) (unit: dB/cm) at a wavelength of 940 nm, the peak absorption coefficient A (p) (unit: dB/cm) at a wavelength of from 940 to 990 nm and the index for flatness of the absorption coefficients in a wavelength region of from 915 to 940 nm i.e. the ratio A' of the maximum value to the minimum value among the absorption coefficients, are shown in Tables.

Examples 1 to 20 are Working Examples of the present invention, and Examples 21 and 22 are Comparative Examples. Each of glasses in Examples 1 to 20 has a Tg of at least 430° C. and is thermally stable, and A (p) is at least 4 dB/cm.

Further, the glasses in Examples 1 to 7 have the same compositional proportions except for the content of Yb, and they are different in the content of Yb. It is evident that as the content of Yb increases, the emission intensity E and the absorption coefficient monotonically increases.

Further, it is evident that in Examples 1 to 20 of the present invention, the emission intensity E is strong, but in Comparative Examples 21 and 22 containing Er, the emission intensity E is remarkably low.

Further, FIG. 1 shows the absorption spectrum in Example 8. The ordinate represents the absorption coefficient (unit: dB/cm), and the abscissa represents the wavelength (unit: nm). It is seen that the absorption spectrum is smooth in a wavelength region of from 915 to 965 nm.

Further, in Examples 1 to 20, the above mentioned A' is at most 1.5, and accordingly, it becomes possible to suppress the output variation by adjusting the wavelength of the excitation light to be within such a flat wavelength zone of from 915 to 940 nm.

Further, by using the glass shown in Example 8 as a core, and a glass comprising, as represented by mol %, 42.8% of $Bi_2O_3$, 34.2% of $SiO_2$, 14.3% of $Ga_2O_3$, 7.1% of $Al_2O_3$, 1.4% of $La_2O_3$ and 0.2% of $CeO_2$, as a clad, a fiber having a core diameter of 5.2 μm was prepared. By using such a glass having a large $Yb^{3+}$ absorbance, it was confirmed that laser oscillation was possible at a wavelength of 1,064 nm even with a fiber having a length of as short as 19 cm.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $Bi_2O_3$ | 42.7 | 42.6 | 42.6 | 42.3 | 42.1 | 41.9 | 41.5 | 42.6 |
| $SiO_2$ | 34.2 | 34.1 | 34.0 | 33.9 | 33.7 | 33.5 | 33.2 | 34.0 |
| $B_2O_3$ | 0 | 0 | 0 | 0 | 0 | 0 | 0 | 0 |
| $Al_2O_3$ | 3.6 | 3.6 | 3.5 | 3.5 | 3.5 | 3.5 | 3.5 | 5.4 |
| $Ga_2O_3$ | 17.8 | 17.8 | 17.7 | 17.6 | 17.6 | 17.5 | 17.3 | 15.9 |
| $La_2O_3$ | 1.4 | 1.4 | 1.4 | 1.4 | 1.4 | 1.4 | 1.4 | 1.4 |
| $Yb_2O_3$ | 0.1 | 0.3 | 0.5 | 1.0 | 1.5 | 2.0 | 2.9 | 0.5 |
| $CeO_2$ | 0.2 | 0.2 | 0.2 | 0.2 | 0.2 | 0.2 | 0.2 | 0.2 |
| Tg | 491 | 491 | 493 | 498 | 498 | 501 | 506 | 496 |
| E | 0.30 | 0.44 | 0.68 | 1.01 | 1.26 | 1.44 | 1.53 | 0.74 |
| τ | 0.55 | 0.56 | 0.57 | 0.61 | 0.62 | 0.61 | 0.59 | 0.59 |
| A (915) | 0.8 | 1.6 | 2.7 | 5.5 | 7.5 | 10.1 | 14.9 | 2.7 |
| A (940) | 1.1 | 2.0 | 3.5 | 7.0 | 9.7 | 12.9 | 19.0 | 3.5 |
| A (p) | 4.3 | 8.6 | 14.3 | 28.0 | 41.1 | 53.9 | 77.9 | 14.3 |
| A' | 1.31 | 1.29 | 1.29 | 1.27 | 1.29 | 1.28 | 1.28 | 1.45 |

TABLE 2

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| $Bi_2O_3$ | 41.7 | 43.0 | 36.0 | 50.0 | 40.0 | 44.5 | 41.8 | 45.8 |
| $SiO_2$ | 0 | 10.0 | 30.0 | 30.0 | 36.0 | 35.0 | 36.0 | 32.0 |
| $B_2O_3$ | 30.0 | 26.6 | 17.8 | 0 | 5.0 | 2.0 | 0 | 0 |
| $Al_2O_3$ | 6.0 | 10.0 | 5.0 | 4.0 | 2.3 | 9.0 | 0 | 6.0 |
| $Ga_2O_3$ | 19.0 | 8.0 | 10.0 | 14.2 | 15.0 | 7.0 | 21.0 | 13.0 |
| $La_2O_3$ | 2.0 | 1.0 | 0 | 0.5 | 0.5 | 1.0 | 0 | 2.0 |
| $Yb_2O_3$ | 1.0 | 1.0 | 1.0 | 1.0 | 1.0 | 1.0 | 1.0 | 1.0 |
| $CeO_2$ | 0.3 | 0.4 | 0.2 | 0.3 | 0.2 | 0.5 | 0.2 | 0.2 |
| Tg | 436 | 432 | 459 | 457 | 476 | 480 | 490 | 482 |
| E | 0.89 | 0.70 | 0.68 | 1.00 | 0.98 | 0.89 | 1.23 | 1.00 |
| τ | 0.64 | 0.55 | 0.51 | 0.58 | 0.61 | 0.56 | 0.61 | 0.57 |
| A (915) | 4.4 | 4.6 | 4.8 | 4.9 | 5.0 | 5.1 | 5.1 | 5.1 |
| A (940) | 6.4 | 6.6 | 6.9 | 6.4 | 6.6 | 6.6 | 6.6 | 6.5 |
| A (p) | 28.4 | 29.0 | 30.5 | 26.5 | 28.2 | 27.0 | 27.7 | 26.6 |
| A' | 1.45 | 1.43 | 1.31 | 1.33 | 1.29 | 1.28 | 1.28 | 1.29 |

TABLE 3

|  | Ex. 17 | Ex. 18 | Ex. 19 | Ex. 20 | Ex. 21 | Ex. 22 |
|---|---|---|---|---|---|---|
| $Bi_2O_3$ | 40.0 | 44.7 | 41.8 | 42.6 | 41.8 | 41.7 |
| $SiO_2$ | 43.0 | 28.0 | 33.5 | 35.0 | 34.3 | 33.6 |
| $B_2O_3$ | 0 | 0 | 0 | 0 | 0 | 0 |
| $Al_2O_3$ | 0 | 6.0 | 2.0 | 3.5 | 3.4 | 3.4 |
| $Ga_2O_3$ | 15.0 | 18.0 | 18.0 | 18.0 | 17.6 | 17.6 |

TABLE 3-continued

|  | Ex. 17 | Ex. 18 | Ex. 19 | Ex. 20 | Ex. 21 | Ex. 22 |
|---|---|---|---|---|---|---|
| $La_2O_3$ | 0.8 | 2.0 | 3.5 | 0 | 0 | 0 |
| $Yb_2O_3$ | 1.0 | 1.0 | 1.0 | 0.7 | 0.7 | 1.4 |
| $Er_2O_3$ | 0 | 0 | 0 | 0 | 2.0 | 2.0 |
| $CeO_2$ | 0.2 | 0.3 | 0.2 | 0.2 | 0.2 | 0.2 |
| Tg | 494 | 487 | 497 | 491 | 501 | — |
| E | 1.15 | 1.17 | 1.13 | 0.93 | 0.02 | 0.04 |
| τ | 0.68 | 0.63 | 0.63 | 0.66 | — | — |
| A (915) | 5.1 | 5.2 | 5.2 | 3.7 | 3.6 | — |
| A (940) | 6.6 | 6.6 | 6.5 | 4.7 | 4.6 | — |
| A (p) | 27.8 | 27.0 | 27.2 | 19.7 | 26.5 | — |
| A' | 1.28 | 1.26 | 1.29 | 1.30 | — | — |

INDUSTRIAL APPLICABILITY

The present invention is useful for amplifying light having a wavelength of from 1.0 to 1.2 μm.

The entire disclosure of Japanese Patent Application No. 2008-285527 filed on Nov. 6, 2008 including specification, claims, drawings and summary is incorporated herein by reference in its entirety.

What is claimed is:

1. A light-amplifying glass to be used for amplifying light having a wavelength of 1.0 to 1.2 μm, which comprises, as represented by mol % based on the following oxides, from 30 to 55% of $Bi_2O_3$, from 25 to 50% of either one, or both in total, of $SiO_2$ and $B_2O_3$, from 12 to 27% of either one, or both in total, of $Al_2O_3$ and $Ga_2O_3$, from 0 to 4% of $La_2O_3$ and from 0.1 to 4% of $Yb_2O_3$ and which contains substantially no $Er_2O_3$.

2. A light-amplifying glass which comprises, as represented by mol % based on the following oxides, from 30 to 55% of $Bi_2O_3$, from 25 to 50% of either one, or both in total, of $SiO_2$ and $B_2O_3$, from 12 to 27% of either one, or both in total, of $Al_2O_3$ and $Ga_2O_3$, from 0 to 4% of $La_2O_3$ and from 0.1 to 4% of $Yb_2O_3$ and which contains substantially no $Er_2O_3$ or $Tm_2O_3$.

3. The light-amplifying glass according to claim 2, which is to be used for amplifying light having a wavelength of from 1.0 to 1.2 μm.

4. The light-amplifying glass according to claim 1, wherein $Bi_2O_3$ is from 35 to 50%, $SiO_2$ is from 0 to 45%, $B_2O_3$ is from 0 to 35%, $Al_2O_3$ is from 0 to 12% and $Ga_2O_3$ is from 5 to 25%.

5. The light-amplifying glass according to claim 2, wherein $Bi_2O_3$ is from 35 to 50%, $SiO_2$ is from 0 to 45%, $B_2O_3$ is from 0 to 35%, $Al_2O_3$ is from 0 to 12% and $Ga_2O_3$ is from 5 to 25%.

6. The light-amplifying glass according to claim 1, wherein $SiO_2$ is at least 25% and $B_2O_3$ is from 0 to 10%.

7. The light-amplifying glass according to claim 2, wherein $SiO_2$ is at least 25% and $B_2O_3$ is from 0 to 10%.

8. The light-amplifying glass according to claim 1, which contains at most 1% of $CeO_2$.

9. The light-amplifying glass according to claim 2, which contains at most 1% of $CeO_2$.

10. The light-amplifying glass according to claim 1, which has an absorption coefficient of at least 1 dB/cm at a wavelength of 940 nm.

11. The light-amplifying glass according to claim 2, which has an absorption coefficient of at least 1 dB/cm at a wavelength of 940 nm.

12. The light-amplifying glass according to claim 1, which has an absorption coefficient of at least 4 dB/cm at a wavelength within a wavelength region of from 940 to 990 nm.

13. The light-amplifying glass according to claim 2, which has an absorption coefficient of at least 4 dB/cm at a wavelength within a wavelength region of from 940 to 990 nm.

14. The light-amplifying glass according to claim 1, which has a glass transition temperature of at least 400° C.

15. The light-amplifying glass according to claim 2, which has a glass transition temperature of at least 400° C.

16. An optical waveguide having the light-amplifying glass as defined in claim 1, as a core.

17. An optical waveguide having the light-amplifying glass as defined in claim 2, as a core.

18. An optical fiber having the light-amplifying glass as defined in claim 1, as a core.

19. An optical fiber having the light-amplifying glass as defined in claim 2, as a core.

* * * * *